July 25, 1950     W. C. COLEMAN     2,516,368
HEATING APPARATUS
Filed July 14, 1947                                2 Sheets-Sheet 1
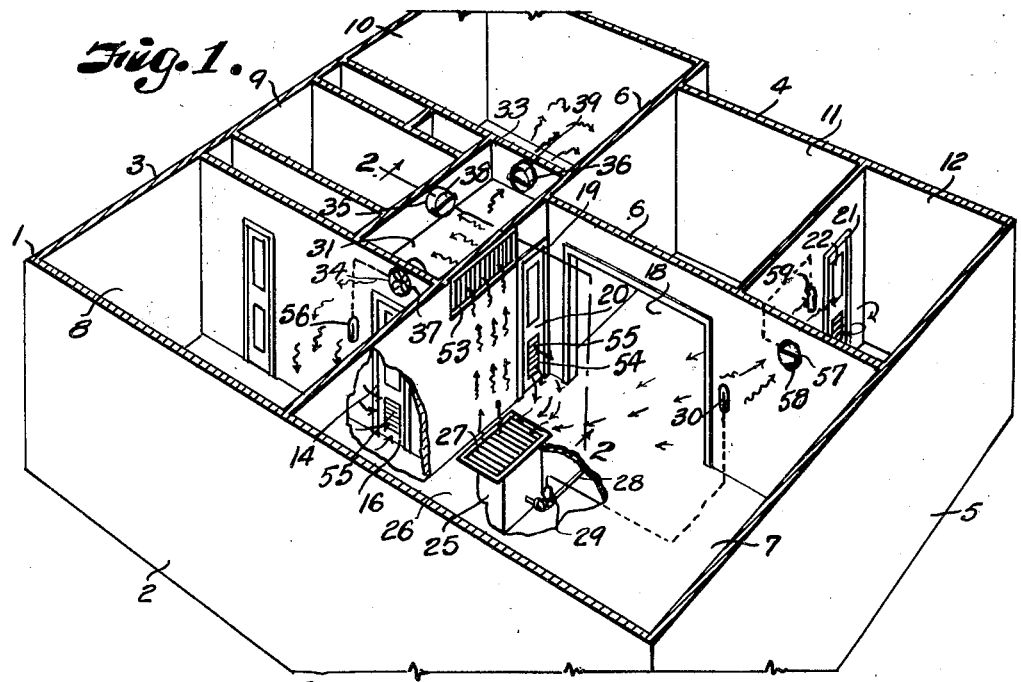
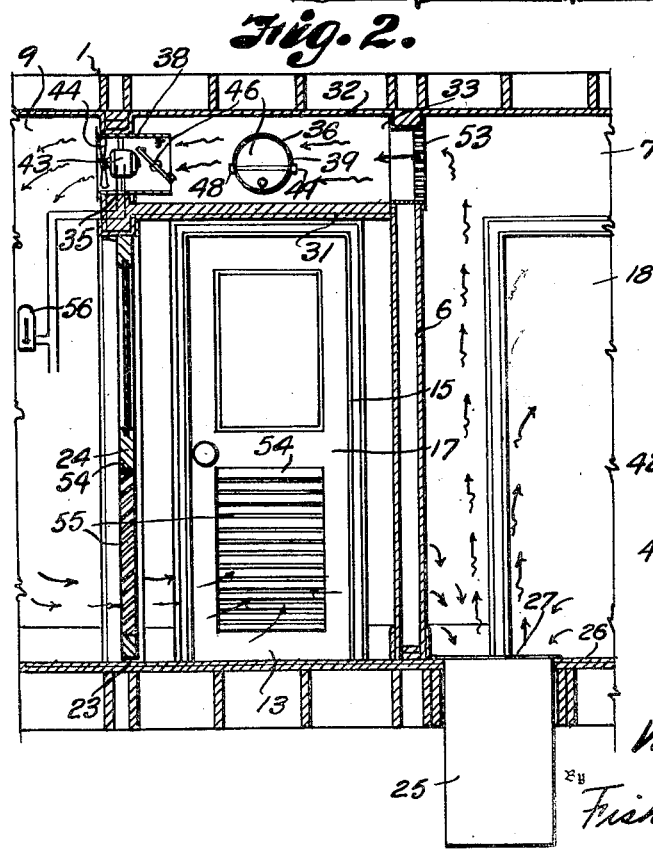
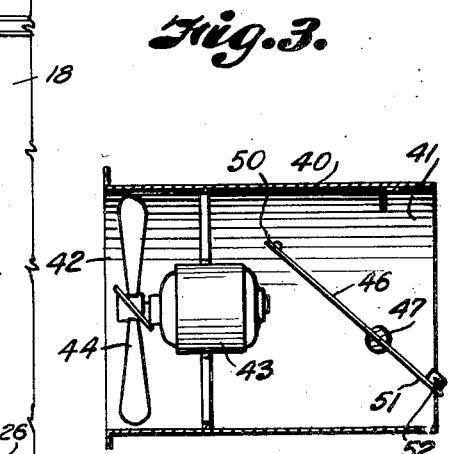
Inventor
William C. Coleman.
By Fishburn & Mullendore
Attorneys July 25, 1950 W. C. COLEMAN 2,516,368
HEATING APPARATUS Filed July 14, 1947 2 Sheets-Sheet 2

Inventor
William C. Coleman.
By Fishburn & Mullendore
Attorneys

Patented July 25, 1950

2,516,368

UNITED STATES PATENT OFFICE 2,516,368

HEATING APPARATUS

William C. Coleman, Wichita, Kans., assignor to The Coleman Company, Inc., Wichita, Kans., a corporation of Kansas Application July 14, 1947, Serial No. 760,875

2 Claims. (Cl. 237—2)

This invention relates to warm air heating apparatus particularly for heating a plurality of rooms or spaces and has for its principal object to provide a heating apparatus of simple, inexpensive construction and which includes a common heating unit such as a floor furnace or a space heater and capable of maintaining near uniform predetermined temperatures in the rooms or spaces to be heated during and between operating periods of the heating unit.

Other objects of the invention are to provide a chamber for receiving and distributing warm air from the heating unit to rooms or spaces separated from the space in which the heating unit is installed; to provide forced movement of heated air from the heat distributing chamber into the respective spaces to be heated responsive to predetermined differential temperatures to be maintained in said spaces; to provide for return of cooled air from the spaces served by the distributing chamber into the space that is directly heated by the heating unit; and to provide a simple mechanism for drawing heated air into the distributing chamber for discharge into the spaces to be heated.

In accomplishing these and other objects of the invention, I have provided improved structure, the preferred form of which is illustrated in the accompanying drawing wherein:

Fig. 1 is a perspective diagrammatic view of a common type dwelling having one or more rooms directly heated by a heating unit such as a floor furnace and one or more rooms that are separated from the directly heated rooms and which is equipped with an air circulating apparatus for heating the separated rooms from the directly heated rooms.

Fig. 2 is a vertical section on the line 2—2 of Fig. 1 particularly illustrating the heat distributing chamber and fan units for supplying air to the rooms separated from the rooms that are directly heated by the floor furnace.

Fig. 3 is an enlarged section through one of the fan units.

Figure 4:
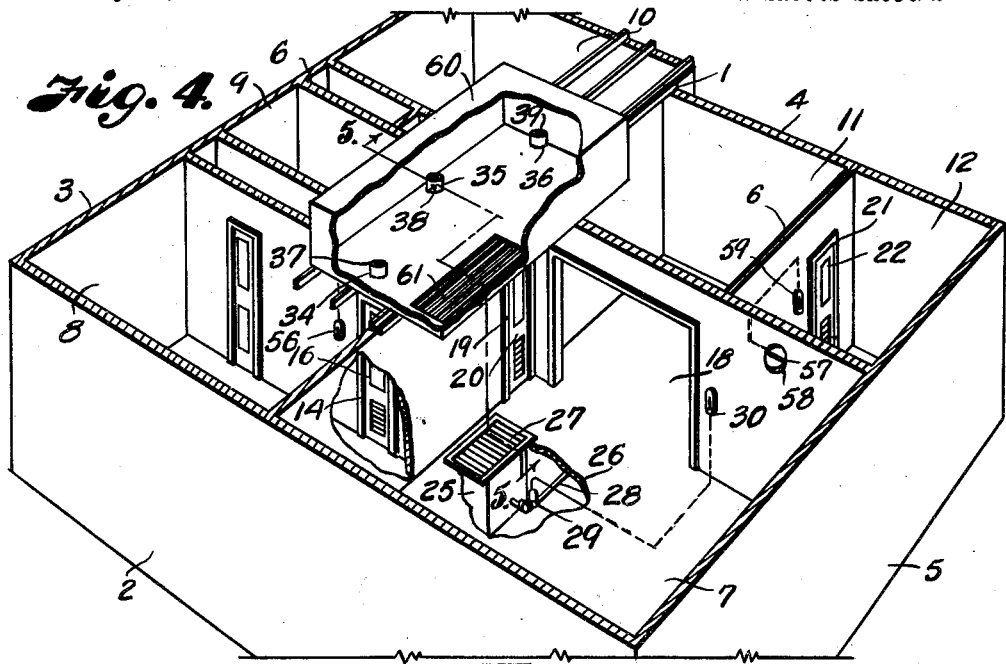
Fig. 4 is a perspective diagrammatic view of a common type of dwelling similar to Fig. 1 but showing the distributing compartment located in the attic.

Referring more in detail to the drawings:

1 designates a dwelling having exterior walls 2, 3, 4 and 5 and various transverse partitions 6 forming rooms 7, 8, 9, 10, 11 and 12 and a central hall 13. The rooms 8 and 10 may be bedrooms having entrances from the hall 13 through doorways 14 and 15 that are normally closed by doors 16 and 17 for maintaining privacy in the respective rooms. The rooms 7 and 11 may be living and dining rooms connected by a relatively wide doorway 18 through which air may circulate freely therebetween. The living room 7 is usually connected with a hall 13 through door opening 19 closed by a door 20. The room 12 may constitute a kitchen that is connected with the dining room through a door opening 21 that is normally closed by a door 22. The room 9 is a bathroom and connects with the hall 13 through a door opening 23 adapted to be closed by a door 24.

Small dwellings of this character are often heated by a single heating unit located in the living room to directly heat the living and dining rooms and to heat to some extent, the bedrooms, bathroom and kitchen when the doors thereto are left open. In many instances the rooms not directly heated by the heating unit are inadequately heated and the rooms receive practically no heat when the doors are closed to maintain privacy in the respective rooms.

For example, a floor furnace 25 is mounted in the floor 26 of the living room, somewhere near the door opening 18 and the floor opening is covered by a grill 27. A suitable fuel is supplied to the burner of the furnace through a duct 28 under control of a valve 29 which is operated by a thermostat 30 located on one of the walls of the room 7. When the temperature in the room 7 falls below the temperature set by the thermostat the valve 29 is opened to allow flow of fuel to the furnace for heating air that is drawn from off the floor of the living and dining rooms through the marginal edges of the grill for down circulation and then for upward circulation around the heating unit, the heated air being discharged through the center of the grill. The heated air rises to the upper portion of the room 7 and passes through the opening 18 to the room 11. As the air cools it moves toward the floor and returns to the floor furnace to be reheated. When the temperature reaches that set by the thermostat the furnace is shut down until the thermostat again calls for heat.

When the doors 16, 17, 20, 22 and 24 are open some of the warm air may move into the rooms 8, 9, 10 and 12 but this movement of air is relatively small, particularly in cold weather so that it is difficult to heat the rooms not directly supplied from the floor furnace.

As above pointed out, it is the purpose of the present invention to obviate this difficulty by providing an apparatus whereby heated air is drawn from the warmer ceiling section of the room 7 into a distributing chamber and positively discharged into any one of the separated rooms 8, 9 and 10 which require heat to maintain predetermined temperatures therein.

In carrying out the invention, the hall 13 is provided with a transverse partition 31 extending thereacross at a point above the doors and spaced from the ceiling 32 (Fig. 2) to cooperate with the side walls to provide a heat distributing chamber 33 that is connected with the rooms 8, 9 and 10 through openings 34, 35 and 36 which are preferably located above the doors 16, 24 and 17 respectively. Located in the openings are air circulating units 37, 38 and 39 respectively. Each unit (see Fig. 3) comprises a casing 40 having open ends to provide an inlet 41 and an outlet 42, the inlet 41 being projected into the heat distributing compartment 33. Located preferably at the outlet end of each casing is a motor 43 having a fan 44 rotatable within the discharge openings of the casings to draw air through the inlets 41 and discharge the air into the room served thereby whenever the motor is energized responsive to a thermostat 45 located in that room as shown in Fig. 2.

In order to close flow through the casing when the fans are not in operation, the inlet end of each casing is provided with a damper 46 mounted on a cross shaft 47 having its ends journalled in suitable bearings 48 and 49 (Fig. 2) provided in opposite sides of the casing below the horizontal center thereof. The damper 46 is mounted on the shaft below the horizontal diameter thereof so as to provide an upper portion 50 of larger area than the lower portion 51. Each damper, however, is balanced to normally maintain a perpendicular position by a weight 52 that is suitably attached to the lower portion 51 of the damper. Therefore, when the fans are not in operation the dampers normally close flow through the casings, however, when the fans are in operation the movement of air acting on the larger upper areas 50 of the dampers causes the dampers to swing open and remain open while the fans are drawing heated air from the room 7 into the distributing chamber 33 through an elongated grill 53 which grill is mounted in the transverse wall 6 preferably near the room ceiling and directly above the floor furnace 25 so that a portion of the hot air rising therefrom is drawn through the grill into the distributing space whenever one or more of the fans are in operation.

In order to return the air from the respective rooms to the room 7, the bottom portion of each door is provided with openings 54 covered by louvers 55 as best shown in Fig. 2. It is thus obvious that when warm air is discharged into the rooms the cooler air is displaced through the louvered openings of the doors into the hall 13 and through the louvered opening of the door 20 into the room 7 for recirculation through the floor furnace. The motors of the fan units are controlled by room thermostats 56 installed in the respective rooms 8, 9 and 10.

In order to satisfactorily heat the room 12 when the door 22 is closed, one of the inner walls is provided with an opening 57 in which is installed a fan unit 58 corresponding to the fan units previously described and which has the motor thereof controlled by a thermostat 59. Therefore, when the room 12 requires heat, warm air is drawn from the living room 7 by the fan unit 57 and is returned through the louvered portion near the bottom of the door 22. It is thus obvious that a positive circulation may be maintained from the upper hot zone of the directly heated rooms to the other rooms when the thermostats in those rooms call for heat. The cooled air in each room, having settled to the floor, is forced to flow through the louvered door section and back to the furnace to be reheated.

Operation of the apparatus constructed and assembled as described is as follows:

The main thermostat 30 which controls the fuel supply to the furnace 25 is set to maintain a predetermined temperature in the living room 7, for example, 75° F. Therefore, whenever the temperature in the living room and dining room connected therewith tends to fall below the set temperature, the thermostat starts operation of the furnace to heat the air in the casing and cause an upward movement of heated air into the room 7 rising to the ceiling zone and movement of cool air from the room floor is through the grill 27 into heat exchange relation with the heating unit of the furnace. A circulation is thus maintained in the rooms 7 and 11 until the temperature in the room 7 reaches the temperature set by the thermostat 30 whereupon the operation of the furnace is suspended until such a time that the temperature falls below that set by the thermostat.

Assuming that it is desired to heat the room 12, the thermostat 59 may be set to a desired temperature so that when the thermostat 59 calls for heat the motor for the fan unit 57 is energized to draw heated air from the ceiling zone of the room 7 and discharge it into the room 12 for raising the temperature therein, the cool air being displaced through the grill opening in the bottom of the door 22 for return to the heating unit. As warm air is drawn from the room 7 and the cool air from the room 12 is discharged into the room 7, the thermostat 30 again calls for heat and sets the furnce in operation so as to maintain desired temperature in the rooms 7 and 11 while maintaining the desired temperature in the room 12. As soon as the set temperature is reached as set in the room 7, the thermostat 30 effects shutting down of the floor furnace, however, the fan unit 57 may continue to operate until the temperature in the room 12 has reached the temperature as set by the thermostat 58. When the temperatures in the rooms 8, 9 and 10 fall below the temperatures set by the thermostats in those rooms, the fan units 37, 38 and 39 are set into operation to draw heated air from the ceiling zone of room 7 into the distributing chamber 33 and discharge the heated air into the rooms to be heated while the cool air is being displaced through the louvered openings of the respective doors through the hall into the floor zone of room 7. This, of course, will cause a drop of temperature in the room 7 but the thermostat will maintain the furnace in operation to keep up the temperature in the room 7 sufficiently for supplying heated air required to maintain the rooms 8, 9 and 10 at desired temperature.

It is obvious that the thermostats for the respective rooms 8, 9 and 10 may be set at different temperatures so that differential temperatures may be maintained in any one of the rooms and when that predetermined temperature is reached the circulating fan for that room is shut down to suspend discharge of heated air into the room. The other fan units may continue to operate until the temperatures in the rooms supplied thereby reach the temperatures set by the thermostats whereupon the units will shut down until such a time that the thermostats again call for heat.

Figure 5:
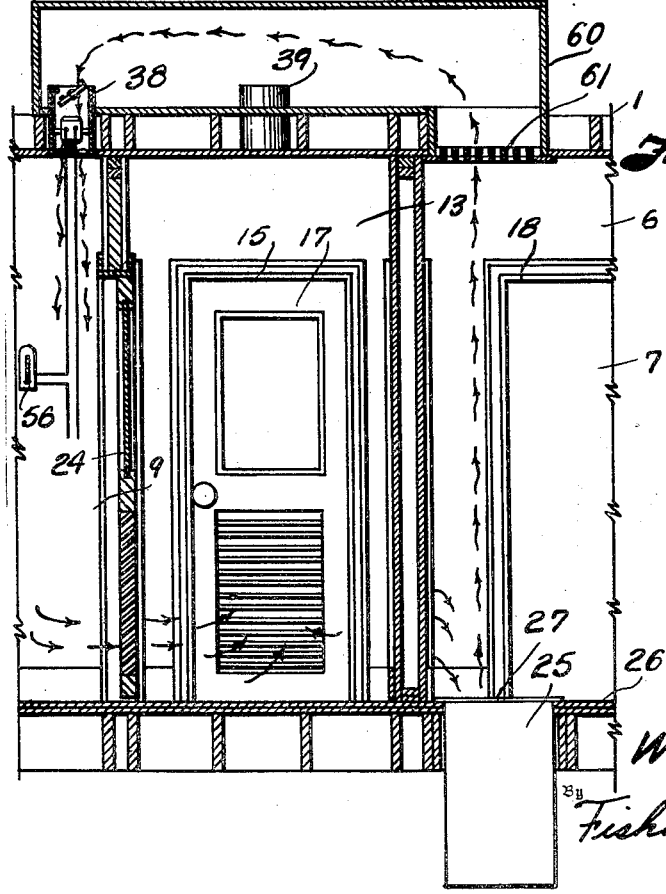
Fig. 5 is a vertical section on the line 5—5 of Fig. 4.

In Figs. 4 and 5 is illustrated a modified form of the invention where the distributing compartment 60 is located in the attic above the central hall 13. The compartment is of sufficient size to extend over a portion of the ceilings of the rooms 7, 8, 9 and 10 to accommodate an inlet grill 61 in the ceiling of the room 7 preferably over the grill of the floor furnace 25 and to accommodate fan units for the rooms 8, 9 and 10 so that they discharge through the ceilings of those rooms. The operation is substantially the same as in the first described form of the invention.

When the thermostat for the rooms 8, 9 or 10 calls for heat that thermostat starts operation of the fan unit for that room and heated air is drawn from the upper portion of the principal room through the inlet grill 61 into the distributing compartment 60 from where the fan unit discharges heated air into the room until the thermostat is again satisfied. The cooled air is passed from the room through the central hall and returns to the principal room by way of the hall doors as in the instance of the first form of the invention.

From the foregoing it is obvious that I have provided an apparatus for efficiently heating the separated rooms of small dwellings which have the principal rooms heated directly by any type of convection heating unit. It is also obvious that differential temperatures may be maintained in any of the respective rooms while maintaining a predetermined temperature in the rooms directly heated by a convection heating unit which has thermostatic controls and adequate B. t. u. output to replace the heat lost from all the rooms.

What I claim and desire to secure by Letters Patent is:

1. A heating apparatus for a dwelling having a principal room connected with other rooms for movement of air to be heated from one room to the other, means forming an air distributing compartment near the ceiling level of said rooms and having an inlet connected with the principal room and having outlets to the other of said rooms, a heating unit for supplying heated air directly into the principal room, a fan in each of said outlets of the compartment for drawing heated air from the principal room through the inlet into said compartment and discharging the heated air into the other of said rooms, an individual motor for each fan, means for independently controlling operation of said motors and a shutter for each outlet responsive to operation of the motor associated with that outlet for closing the outlet when the motor is not operating, to prevent drawing of air from said other rooms when one of the other motors is in operation, and to open the outlet when the motor for that outlet is operated.

2. A heating apparatus for a dwelling having a principal room connected with other rooms for movement of air to be heated from one room to the other, means forming an air distributing compartment near the ceiling level of said rooms and having an inlet connected with the principal room and having outlets to the other of said rooms, a heating unit for supplying heated air directly into the principal room, a fan in each of said outlets of the compartment for drawing heated air from the principal room through the inlet into said compartment and discharging the heated air into the other of said rooms, an individual motor for each fan, a thermostatic switch in each of said other rooms, a circuit for each switch and connected with the motor operating fan for that room whereby each fan is adapted to be responsive to temperature to be maintained in the room served thereby, and a shutter for each outlet responsive to operation of the motor associated with that outlet for closing the outlet when the motor is not operating to prevent drawing of air from said other rooms when one of the other motors is in operation and to open the outlet when the motor for that outlet is operated.

WILLIAM C. COLEMAN.

REFERENCES CITED

The following references are of record in the file of this patent:

UNITED STATES PATENTS

| Number | Name | Date |
|---|---|---|
| 360,223 | Johnson | Mar. 29, 1887 |
| 1,189,572 | Ilg | July 4, 1916 |
| 2,145,641 | Baker | Jan. 31, 1939 |
| 2,178,268 | Riehl | Oct. 31, 1939 |
| 2,338,356 | Powers | Jan. 4, 1944 |